US012715176B2

(12) United States Patent
Nagatani et al.

(10) Patent No.: US 12,715,176 B2
(45) Date of Patent: Aug. 25, 2026

(54) SUPPORT MATERIAL REMOVAL DEVICE AND SUPPORT MATERIAL REMOVAL METHOD

(71) Applicant: SEIKO EPSON CORPORATION, Tokyo (JP)

(72) Inventors: Kaname Nagatani, Matsumoto (JP); Hirokazu Sekino, Chino (JP); Tomoki Abe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 46 days.

(21) Appl. No.: 18/751,209

(22) Filed: Jun. 22, 2024

(65) Prior Publication Data

US 2024/0424740 A1 Dec. 26, 2024

(30) Foreign Application Priority Data

Jun. 23, 2023 (JP) ................................ 2023-103593

(51) Int. Cl.

*B29C 64/40* (2017.01)
*B29C 64/393* (2017.01)
*B33Y 30/00* (2015.01)
*B33Y 40/20* (2020.01)
*B33Y 50/02* (2015.01)

(52) U.S. Cl.

CPC ............ *B29C 64/40* (2017.08); *B29C 64/393* (2017.08); *B33Y 30/00* (2014.12); *B33Y 40/20* (2020.01); *B33Y 50/02* (2014.12)

(58) Field of Classification Search

CPC .. B22F 10/66; B22F 10/40; B22F 3/24; B22F 10/68; B29C 64/35; B33Y 40/20

See application file for complete search history.

(56) References Cited

U.S. PATENT DOCUMENTS

2005/0004282 A1* 1/2005 Priedeman, Jr. ....... B33Y 70/00 264/308
2010/0170540 A1* 7/2010 Kritchman ............. B33Y 40/20 134/198
2011/0060445 A1* 3/2011 Heenan ................. B29C 64/106 264/255
2016/0009917 A1* 1/2016 Hirsch .................... B29C 64/40 524/610

(Continued)

FOREIGN PATENT DOCUMENTS

JP 2018509501 A 4/2018
WO WO-2022231968 A1 * 11/2022 ............. B22F 10/68

*Primary Examiner* — Yung-Sheng M Tsui

(74) *Attorney, Agent, or Firm* — CHIP LAW GROUP

(57) ABSTRACT

There is provided a support material removal device for removing a support material from a three-dimensional molded object in an ejection target by ejecting liquid at the ejection target, which was molded by a three-dimensional molding machine, includes a nozzle for ejecting the liquid, an arm for gripping the nozzle, a trajectory calculating section for calculating a trajectory for driving the arm based on first shape information indicating the shape of the ejection target in a state where the support material is attached to it and second shape information indicating the shape of the three-dimensional molded object corresponding to the state where the support material is removed from the ejection target, and a drive section for driving the arm based on the trajectory calculated by the trajectory calculating section.

8 Claims, 5 Drawing Sheets

(56) References Cited

U.S. PATENT DOCUMENTS

2016/0229128 A1* 8/2016 Dayagi ............... B28B 17/0081
2017/0001382 A1* 1/2017 Stepper ..................... C08F 2/48
2017/0066197 A1* 3/2017 Morikawa ............. B29C 64/112
2017/0239893 A1* 8/2017 Hoover ................. B29C 64/393
2018/0215937 A1* 8/2018 Kim ..................... C09D 11/106
2019/0119514 A1 4/2019 Yudovin-Farber et al.
2019/0176403 A1* 6/2019 Hutchinson ............ B33Y 40/20
2019/0202126 A1* 7/2019 Hutchinson ............. B05B 14/40
2022/0097303 A1* 3/2022 Hutchinson ............... B08B 3/00
2022/0396031 A1* 12/2022 Murciego Rodriguez .................. B29C 64/232
2023/0278107 A1* 9/2023 Schudeleit .............. B22F 10/47

* cited by examiner

SUPPORT MATERIAL REMOVAL DEVICE AND SUPPORT MATERIAL REMOVAL METHOD

The present application is based on, and claims priority from JP Application Serial Number 2023-103593, filed Jun. 23, 2023, the disclosure of which is hereby incorporated by reference herein in its entirety.

BACKGROUND

1. Technical Field

The present disclosure relates to a support material removal device and a support material removal method.

2. Related Art

Three-dimensional molding machines for shaping three-dimensional molded objects have been used. Among them, there is a three-dimensional molding machine for shaping a three-dimensional molded object being shaped, while temporarily supporting the object using a support material. In the case of a three-dimensional molded object shaped by a three-dimensional molding machine having such a configuration, the support material is removed after the three-dimensional molded object is formed. Here, JP-A-2018-509501 describes using a specific water-soluble polymer compound to facilitate removal of the support material formulation.

However, generally, even if a water-soluble polymer compound is used as the support material, manual work by trained personnel is required to remove the support material attached to the three-dimensional molded object. Thus, even by using the support material formulation of JP-A-2018-509501, it is still difficult to adequately suppress the burden and cost of removing the support material from the three-dimensional molded object.

SUMMARY

A support material removal device according to the present disclosure for overcoming the above problem is a support material removal device that removes support material from the three-dimensional molded object molded by a three-dimensional molding machine, the support material removal device including: a nozzle configured to eject liquid; an arm configured to grip the nozzle; a trajectory calculating section configured to calculate a trajectory for driving the arm based on first shape information, which indicates a shape of the ejection target in a state where the support material is attached, and on second shape information, which indicates a shape of the three-dimensional molded object corresponding to a state where the support material has been removed from the ejection target; and a drive section configured to drive the arm based on the trajectory calculated by the trajectory calculating section.

A support material removal method for overcoming the above problems is a support material removal method of using a support material removal device, which includes a nozzle for ejecting liquid and an arm for gripping the nozzle, to eject liquid against an ejection target, which was molded by a three-dimensional molding machine that shaped a three-dimensional molded object while the three-dimensional molded object is supported by the support material, to, with respect to the ejection target, remove the support material from the three-dimensional molded object, the support material removal method including calculating a trajectory for driving the arm based on first shape information, which indicates a shape of the ejection target in a state in which the support material is attached, and second shape information, which indicates a shape of the three-dimensional molded object corresponding to a state in which the support material has been removed from the ejection target and based on the calculated trajectory, driving the arm and ejecting the liquid from the nozzle to remove the support material.

DESCRIPTION OF EMBODIMENTS

Figure 1:
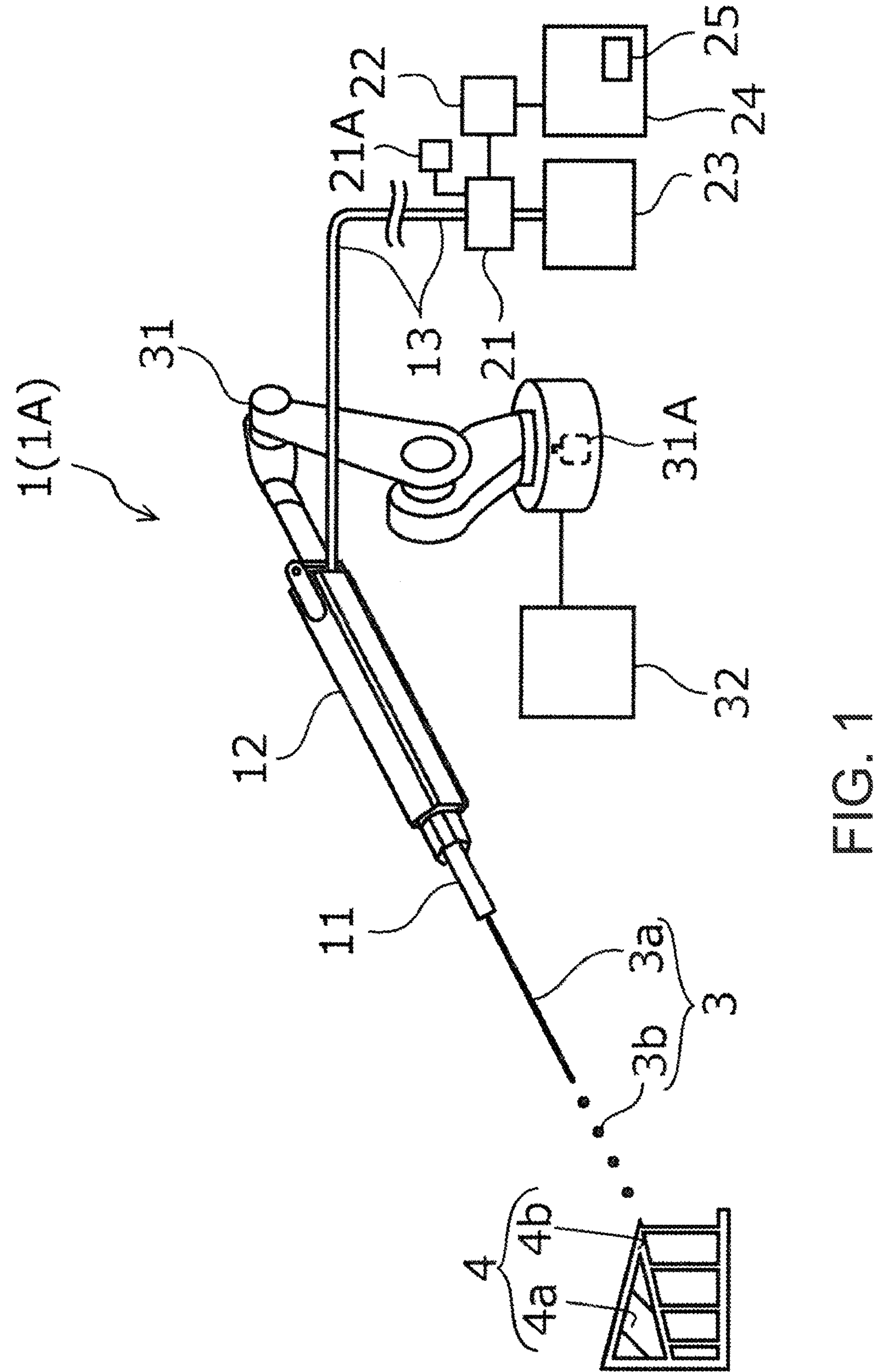
FIG. 1 is a schematic view showing a support material removal device according to a first embodiment.

First, the present disclosure will be generally described.

A support material removal device according to a first aspect of the present disclosure is a support material removal device that ejects liquid to an ejection target, which was molded by a three-dimensional molding machine that shaped a three-dimensional molded object while the three-dimensional molded object is supported by the support material, to, with respect to the ejection target, remove support material from the three-dimensional molded object, the support material removal device including: a nozzle configured to eject liquid; an arm configured to grip the nozzle; a trajectory calculating section configured to calculate a trajectory for driving the arm based on first shape information, which indicates a shape of the ejection target in a state where the support material is attached, and on second shape information, which indicates a shape of the three-dimensional molded object corresponding to a state where the support material has been removed from the ejection target; and a drive section configured to drive the arm based on the trajectory calculated by the trajectory calculating section.

According to this aspect, an arm for holding the nozzle for ejecting the liquid is provided, and the arm can be driven to remove the support material based on the first shape information indicating the shape of the ejection target in the state where the support material is attached and the second shape information indicating the shape of the three-dimensional molded object corresponding to the state where the support material is removed. Therefore, the support material can be automatically removed when the support material is removed from the three-dimensional molded object. Therefore, it is possible to suppress the burden and cost of removing the support material from the three-dimensional molded object.

A support material removal device according to a second aspect of the present disclosure is an aspect according to the first aspect, wherein the nozzle ejects the liquid in a continuous flow and changes the continuous flow to droplets so that the liquid collides with the ejection target in the form of droplets.

According to this aspect, the liquid is ejected in a continuous flow, and the continuous flow is made into droplets to collide with the ejection target in the form of droplets. According to such a configuration, compared with a configuration in which the liquid is caused to collide with the ejection target in a continuous flow, for example, the collision energy when the liquid is caused to collide with the ejection target can be significantly increased, and the effect of removing the support material from the three-dimensional molded object can be significantly improved.

A support material removal device according to a third aspect of the present disclosure is an aspect according to the first aspect or the second aspect, further including an ejection pressure adjustment section that adjusts the ejection pressure of the liquid from the nozzle based on the shape of the support material or the type of the support material in the first shape information.

According to this aspect, there is provided an ejection pressure adjustment section that adjusts the ejection pressure of the liquid from the nozzle based on the shape of the support material or the type of the support material in the first shape information. Therefore, the ejection pressure of the liquid from the nozzle can be appropriately adjusted automatically in accordance with the shape of the support material used or the type of the support material used.

A support material removal device according to a fourth aspect of the present disclosure is an aspect according to the third aspect, wherein the shape of the support material is the volume of the support material contained per unit volume.

According to this aspect, there is provided an ejection pressure adjustment section that adjusts the ejection pressure of the liquid from the nozzle based on the volume of the support material included per unit volume, that is, based on the thickness of the support material. Therefore, the ejection pressure of the liquid from the nozzle can be appropriately adjusted automatically in accordance with the volume of the support material contained per unit volume.

A support material removal device according to a fifth aspect of the present disclosure is an aspect according to the first aspect or the second aspect, wherein the trajectory calculating section calculates a first trajectory for removing a portion of the support material from the ejection target and a second trajectory for further removing support material attached to the ejection target from which the portion of the support material was removed.

According to the present aspect, the trajectory calculating section calculates a first trajectory for removing a portion of the support material from the ejection target and a second trajectory for further removing the remaining support material attached to the ejection target from which the portion of the support material has been removed. That is, the finishing touches of removal of the support material can be performed after a rough removal of the support material from the ejection target. With such a configuration, the effect of removing the support material from the three-dimensional molded object can be improved.

A support material removal device according to a sixth aspect of the present disclosure is an aspect according to the first aspect or the second aspect, wherein the arm is configured to hold the nozzle such that the ejection direction of the liquid from the nozzle is movable and is configured to adjust the ejection direction of the liquid from the nozzle based on the shape of the support material in the first shape information.

According to this aspect, the arm holds the nozzle so it can move the ejection direction in which the liquid is ejected from the nozzle, and so it can adjust the ejection direction in which the liquid is ejected from the nozzle based on the shape of the support material in the first shape information. With such a configuration, it is possible to appropriately cause the liquid to collide with the support material, and it is possible to improve the effect of removing the support material from the three-dimensional molded object.

A support material removal device according to a seventh aspect of the present disclosure is an aspect according to the first aspect or the second aspect, further including a detection section configured to detect the support material attached to the ejection target, wherein the trajectory calculating section calculates the trajectory based on a detection result of the detection section.

According to the present aspect, a detection section for detecting the support material attached to the ejection target is provided, and the trajectory calculating section calculates the trajectory based on the detection result of the detection section. Therefore, it is possible to recognized when there is a region where the support material has not been removed, and to suppress the support material from remaining on the three-dimensional molded object.

A support material removal device according to an eighth aspect of the present disclosure is an aspect according to the seventh aspect, wherein the detection section detects the support material attached to the ejection target by capturing an image of the ejection target.

According to the present aspect, the detection section detects the support material attached to the ejection target by capturing an image of the ejection target. With such a configuration, it is possible to improve the precision of detecting the support material attached to the ejection target.

A support material removal method according to a ninth aspect of the present disclosure is a support material removal method of using a support material removal device, which includes a nozzle for ejecting liquid and an arm for gripping the nozzle, to eject liquid against an ejection target, which was molded by a three-dimensional molding machine that shaped a three-dimensional molded object while the three-dimensional molded object is supported by the support material, to, with respect to the ejection target, remove the support material from the three-dimensional molded object, the support material removal method including calculating a trajectory for driving the arm based on first shape information, which indicates a shape of the ejection target in a state in which the support material is attached, and second shape information, which indicates a shape of the three-dimensional molded object corresponding to a state in which the support material has been removed from the ejection target and based on the calculated trajectory, driving the arm and ejecting the liquid from the nozzle to remove the support material.

According to this aspect, the support material can be removed by driving the arm based on the first shape information indicating the shape of the ejection target in the state in which the support material is attached and the second shape information indicating the shape of the three-dimensional molded object corresponding to the state in which the support material has been removed. Therefore, the arm and the nozzle are automatically driven in the support material removal device, and the support material can be automatically removed when the support material is removed from the three-dimensional molded object. Therefore, it is possible to suppress the burden and cost of removing the support material from the three-dimensional molded object.

First Embodiment

Hereinafter, embodiments according to the present disclosure will be described with reference to the accompanying drawings. A support material removal device 1 of the present disclosure is for removing support material 4*b* from a three-dimensional molded object 4*a* in an ejection target 4 by ejecting a liquid 3*b*, such as water or a solvent, to the ejection target 4, which is molded by a three-dimensional molding machine, such as a Polyjet system, which shapes the three-dimensional molded object 4*a* while the three-dimensional molded object 4*a* is being supported by the support material 4*b*. First, an outline of the support material removal device 1A according to the first embodiment, which is an example of the support material removal device 1 of the present disclosure, will be described with reference to FIG. 1.

Here, the support material removal device 1A of the present embodiment ejects the liquid 3 from the nozzle 11 in a continuous flow 3*a*, changes the continuous flow 3*a* into droplets 3*b*, and causes the liquid 3 to collide against the ejection target 4 in the state of droplets 3*b* and, by this, removing the attached portion 4*b* from the object 4*a* of the ejection target 4. By adopting such a configuration, for example, as compared with a configuration in which the liquid 3 is caused to collide with the ejection target 4 in a continuous flow 3*a*, the collision energy when the liquid is caused to collide with the ejection target 4 can be significantly increased, and the effect of removing the support material from the three-dimensional molded object can be significantly improved. However, the present disclosure is not limited to such a configuration.

The support material removal device 1A of the present embodiment shown in FIG. 1 is provided with a main body 12 and a nozzle 11 that is attached to the main body 12. The nozzle 11 is for ejecting the liquid 3 in a continuous flow 3*a* and for converting the continuous flow 3*a* into droplets 3*b*. The support material removal device 1A of this embodiment is provided with a liquid tank 23 for storing the liquid 3 to be ejected from the nozzle 11, a liquid flow path 13 partially passing through the inside of the main body 12 and coupling the liquid tank 23 and the nozzle 11, and a pump 21 for supplying the liquid 3 from the liquid tank 23 to the nozzle 11.

The pump 21 is provided with a switch 21A for turning on and off the pump 21. The switch 21A can be turned on or off manually by the user. The support material removal device 1A of this embodiment is provided with an ejection pressure adjustment section 22 for adjusting the ejection pressure of the liquid 3 from the nozzle 11, and a control section 24 that is connected to the ejection pressure adjustment section 22 and that controls drive of the pump 21. The control section 24 is provided with a storage section 25 for storing various data, a drive program of the pump 21, and the like.

In this way, the support material removal device 1A of the present embodiment can have ejection of the liquid 3 be turned on or off by the switch 21A. However, it is not limited to such a configuration and, for example, the strength of the ejection pressure of the liquid 3 may be controlled by the switch 21A. The strength of the ejection pressure of the liquid 3 may be changed depending on the attached portion 4*b*. By changing the ejection pressure, it is possible to change the strength with which the droplets 3*b* are caused to collide with the ejection target 4, and it is also possible to change the distance with which the continuous flow 3*a* is made into droplets 3*b*.

The support material removal device 1A of the present embodiment includes the nozzle 11 for ejecting the liquid 3 as described above and, as shown in FIG. 1, an arm 31 for holding the nozzle 11. Note that the type and structure of the arm 31 are not particularly limited and may use, without any particular limitation, a six axis articulated robot, a scalar robot, a robot using an XYZ axis stage, or the like as a portion thereof. However, it is desirable that the arm 31 be configured to be capable of changing the arrangement and the ejection direction of the nozzle 11 in all directions by 360° with respect to the ejection target 4. The arm 31 is electrically connected to the arm control section 32. The arm control section 32 is connected to a computer (not shown) and functions as a trajectory calculating section that calculates the trajectory for driving the arm 31 based on first shape information indicating the shape of the ejection target 4 in the state with the support material 4*b* attached to it and on second shape information indicating the shape of the three-dimensional molded object 4*a* corresponding to the state in which the support material 4*b* has been removed from the ejection target 4, both of which are input from a computer. A drive section 31A, which is a motor for driving the arm 31 based on the trajectory calculated by the arm control section 32, is provided inside the arm 31. Note that, although omitted from the drawings, a plurality of motors are provided as the drive section 31A.

In this way, the support material removal device 1A of the present embodiment is provided with the arm 31 for holding the nozzle 11 for ejecting the liquid 3*b*, and the support material 4*b* can be removed by driving the arm 31 based on the first shape information indicating the shape of the ejection target 4 in the state where the support material 4*b* is attached to it and the second shape information indicating the shape of the three-dimensional molded object 4*a* corresponding to the state where the support material 4*b* has been removed. Therefore, the support material removal device 1A of this embodiment can automatically remove the support material 4*b* when removing the support material 4*b* from the three-dimensional molded object 4*a*. Therefore, it is possible to suppress the burden and cost when removing the support material 4*b* from the three-dimensional molded object 4*a*. More specifically, it is to remove support possible the material from the three-dimensional molded object in a short time without using manual labor, as compared with the case where the user manually removes the support material from the three-dimensional molded object using a tool or the like.

When the above is described from the viewpoint of a support material removal method, it is possible to execute the support material removal method for efficiently removing the support material 4*b* from the three-dimensional molded object 4*a* in the ejection target 4 by using the support material removal device 1A of the present embodiment to eject the liquid 3*b* to the ejection target 4, which was shaped by a three-dimensional molding machine for shaping the three-dimensional molded object 4*a* while supporting the three-dimensional molded object 4*a* using the support material 4*b*. In the support material removal method, a trajectory for driving an arm 31 is calculated based on the first shape information indicating the shape of the ejection target 4 to which support material 4*b* is attached and the second shape information indicating the shape of the three-dimensional molded object 4*a* corresponding to the state in which the support material 4*b* has been removed from the ejection target 4, and the arm 31 is driven based on the calculated trajectory while liquid 3 is ejected from the nozzle 11 to remove the support material 4*b*. By executing the support material removal method, it is possible to suppress the burden and cost at the time of removing the support material 4*b* from the three-dimensional molded object 4*a*.

In the support material removal device 1A of the present embodiment, the liquid 3 is stored in the liquid tank 23 connected to the pump 21. However, it is not limited to such a configuration. For example, with respect to the supply of the liquid 3 to the pump 11, tap water as the liquid 3 may be supplied to the pump 11 directly from a tap water faucet by connecting a tube to the tap water faucet. Further, instead of connecting the liquid flow path 13 to the pump 21, the liquid flow path 13 may be connected directly to a tap water faucet. The type of the liquid 3 is not particularly limited.

The support material removal device 1A of this embodiment is configured to be capable of removing the support material 4*b* attached to the three-dimensional molded object 4*a* that was molded by three-dimensional molding machines having various configurations. In other words, the support material removal device 1A of this embodiment can be used for a plurality of types of support material 4*b*. As described above, the support material removal device 1A of the present embodiment includes the storage section 25 and the ejection pressure adjustment section 22. The storage section 25 stores the correspondence relation between the type of the support material 4*b* and the ejection pressure of the liquid 3*b*, and the correspondence relation between the shape of the support material 4*b*, which corresponds to the volume (thickness of the support material 4*b*) per unit volume, the configuration, and the like of the support material 4*b*, and the ejection pressure of the liquid 3*b* and, by the control of the control section 24 based on these correspondences, the ejection pressure adjustment section 22 can adjust the ejection pressure of the liquid 3*b* from the nozzle 11 in accordance with the type and shape of the support material 4*b*. Therefore, the support material removal device 1A of this embodiment can automatically appropriately adjust the ejection pressure of the liquid 3*b* from the nozzle 11 in accordance with the type and shape of the support material 4*b*, and can effectively remove the support material 4*b* from the three-dimensional molded object 4*a*. It should be noted that this correspondence relationship is set to an ejection pressure that can remove the support material 4*b* but is an ejection pressure that does not damage the three-dimensional molded object 4*a*.

In the support material removal device 1A of this embodiment, the nozzle 11 to be mounted on the main body 12 can be replaced. By replacing the nozzle 11, the nozzle diameter of the ejection aperture through which the liquid 3 is ejected from the nozzle 11 can be changed. Therefore, the support material removal device 1A of this embodiment can eject the liquid 3 from the nozzle 11 having a preferable nozzle diameter in accordance with, for example, the type of the support material 4*b*. Note that this embodiment is configured so that the liquid 3 can be ejected from the nozzle 11 having a preferable nozzle diameter in accordance with, for example, the type of the support material 4*b*, by replacing the nozzle 11 mounted on the main body 12. However, it is not limited to such a configuration, and it may be a configuration in which a nozzle 11 with a plurality of ejection apertures having different nozzle diameters is mounted on the main body 12, and in which the ejection aperture used in the nozzle 11 can be appropriately changed.

As described above, the support material removal device 1A of the present embodiment can change removal conditions such as ejection pressure and nozzle diameter in accordance with the conditions of the attached portion 4*b* to be removed. Further, a temperature adjusting mechanism (heater, not shown) is provided so that the temperature of the liquid 3 ejected from the nozzle 11 can be adjusted. Therefore, it is possible to configure it so that the ejection pressure of the liquid 3, the nozzle diameter, the type of the liquid 3, the temperature of the liquid 3 based on a temperature adjusting mechanism (not shown), and the like can be presented to the user, or can have their settings automatically changed, in accordance with conditions such as the material, thickness, density, shape, and the like of the three-dimensional molded object 4*a* or of the support material 4*b*.

In this embodiment, the arm 31 is driven to form a trajectory in two-dimensional directions so as to travel once around the periphery of the ejection target 4. Then, the arm 31 is driven three dimensionally by repeatedly driving the arm 31 in the peripheral direction of the trajectory and in the direction intersecting the peripheral direction of the trajectory. Here, generation of the trajectory of the arm 31, which is two dimensional, will be described. First, based on a computer model of the three-dimensional shape of the three-dimensional molded object 4*a*, shape data of support material 4*b* for temporarily supporting the three-dimensional molded object 4*a* during the process of molding the three-dimensional molded object 4*a* is generated. Then, the shape data of the support material 4*b* is added to the computer model of the three-dimensional shape of the three-dimensional molded object 4*a*. Then, the computer model of the three-dimensional shape of the three-dimensional molded object 4*a* and the shape data of the support material 4*b* are converted into sliced two-dimensional data. Then, the arm 31 is two dimensionally driven in accordance with the two dimensional data, and this operation is successively repeated.

Figure 2:
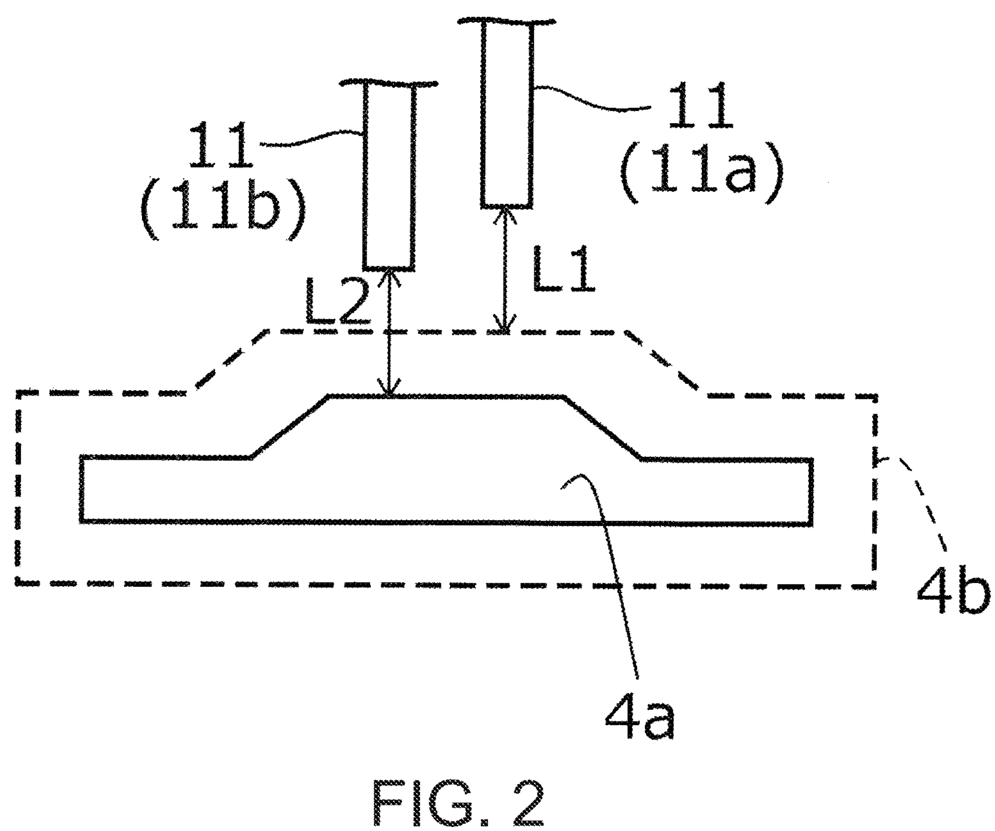
FIG. 2 is a schematic view for explaining an example of the arrangement of the nozzle of the support material removal device of FIG. 1.
Figure 3:
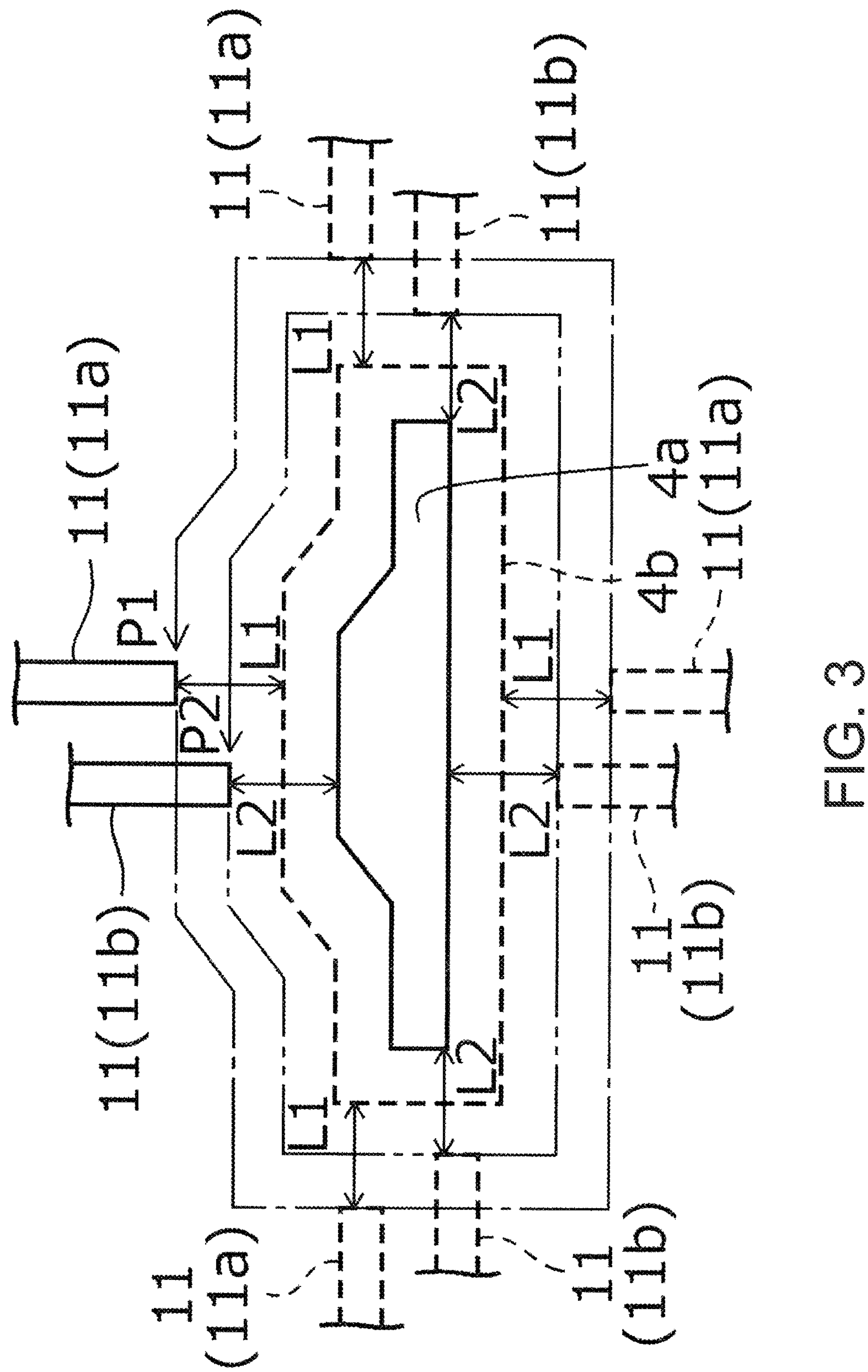
FIG. 3 is a schematic view for explaining an example of the trajectory of the arm of the support material removal device of FIG. 1.

Here, the trajectory of the arm 31 will be described with reference to FIG. 2 and FIG. 3. FIG. 2 and FIG. 3 show two-dimensional data obtained by slicing the three-dimensional shape of the computer model of the three-dimensional molded object 4*a*, which is indicated by solid line, and the shape data of the support material 4*b*, which is indicated by broken line. The data also represents the arrangement of the nozzle 11. The arm 31 is configured to be capable of moving the nozzle 11 along the ejection direction of the liquid 3, and the ejection aperture of the nozzle 11 for the liquid 3 is set so that the distance to the ejection target 4 becomes a desired distance when the liquid 3 is being ejected at the ejection target 4. This is in order to set the distance capable of dividing the liquid 3 that was ejected in a continuous flow 3*a* into droplets 3*b* and apply a desired impact pressure.

Here, the nozzle 11*a* indicated in FIG. 2 corresponds to the state when the support material 4*b* is being roughly removed, and represents the distance from which a desired impact pressure can be applied in an initial state, which is before ejection of the liquid 3 and before any of the support material 4*b* has been removed. Note that the distance from the nozzle 11 to the support material 4*b* in the initial state in this rough removal state is a distance L1.

On the other hand, the nozzle 11*b* indicated in FIG. 2 corresponds to the finishing touches state of removing the support material 4*b*, and represents that the distance from which a desired impact pressure can be applied in the final state, which is when the support material 4*b* has been almost totally removed by the liquid 3 that was ejected as the support material 4*b* was roughly removed. Note that since a considerable amount of the support material 4*b* has already been removed by the start of this finishing touches state, the distance from the nozzle 11 to the three-dimensional molded object 4*a* in the finishing touches state is the distance L2. The distance L2 can be set to, for example, the same distance as the distance L1.

Therefore, in the rough removal state, the support material removal device 1A of the present embodiment drives the arm 31 as represented by the first trajectory P1 in FIG. 3 to maintain the state in which the distance to the support material 4*b* in the initial state is the long distance L1 so that a desired impact pressure can be applied to the support material 4*b* while driving the arm 31 in a trajectory that goes once around the periphery of the three-dimensional molded object 4*a*. On the other hand, in the finishing touches state, the support material removal device 1A of the present embodiment drives the arm 31 as represented by the second trajectory P2 in FIG. 3 to maintain the state in which the distance to the three-dimensional molded object 4*a* is the distance L2 so that a desired impact pressure can be applied to the support material 4*b* and to have a trajectory that goes once around the periphery of the three-dimensional molded object 4*a* so that a desired impact pressure can be applied to the slight amount of support material 4*b* remaining on the surface of the three-dimensional molded object 4*a*.

That is, in the support material removal device 1A of the present embodiment, the arm control section 32, which is a trajectory calculating section, calculates a first trajectory P1 for removing a portion of the support material 4*b* from the ejection target 4 and a second trajectory P2 for further removing the support material 4*b* attached to the ejection target 4 from which the portion of the support material 4*b* was removed. Since the support material removal device 1A of the present embodiment has such a configuration, the finishing touches for removal of the support material 4*b* can be performed after the support material 4*b* has been roughly removed from the ejection target 4. With such a configuration, the effect of removing the support material 4*b* from the three-dimensional molded object 4*a* can be improved.

Note that as shown in FIG. 3, with the support material removal device 1A of the present embodiment, it is possible to change the ejection direction of the liquid 3 from the nozzle 11 by changing the angle of the nozzle 11, and it is a trajectory that goes once around the three-dimensional molded object 4*a* while maintaining the distance from the nozzle 11 to the support material 4*b* so as to be substantially constant. In other words, in the support material removal device 1A of this embodiment, the arm 31 grips the nozzle 11 so that the ejection direction of the liquid 3 from the nozzle 11 can be moved and the arm 31 can adjust the ejection direction of the liquid 3 from the nozzle 11 based on the shape of the support material 4*b* in the first shape information. Since the support material removal device 1A of the present embodiment has such a configuration, the liquid 3 can be made to appropriately collide with the support material 4*b*, and the effect of removing the support material 4*b* from the three-dimensional molded object 4*a* can be improved.

In the support material removal device 1A of the present embodiment, as described above, the ejection conditions such as the ejection pressure can be changed according to the shape of the support material 4*b*, such as portions where the support material 4*b* is formed thick and portions where the support material 4*b* is formed thin. Further, in the support material removal device 1A of the present embodiment, it is possible to recognize, from the shape of the three-dimensional molded object 4*a*, portions where unevenness is formed with a fine resolution and portion where unevenness is formed with only a coarse resolution and it is also possible to change the ejection conditions of the liquid 3 in these portions. These ejection conditions may be configured as a table that includes the correspondence relation between shape of the support material 4*b* and ejection pressure and that is stored in the storage section 25, and these ejection conditions may be changed based on the table, but it is not limited to such a configuration.

Second Embodiment

Figure 4:
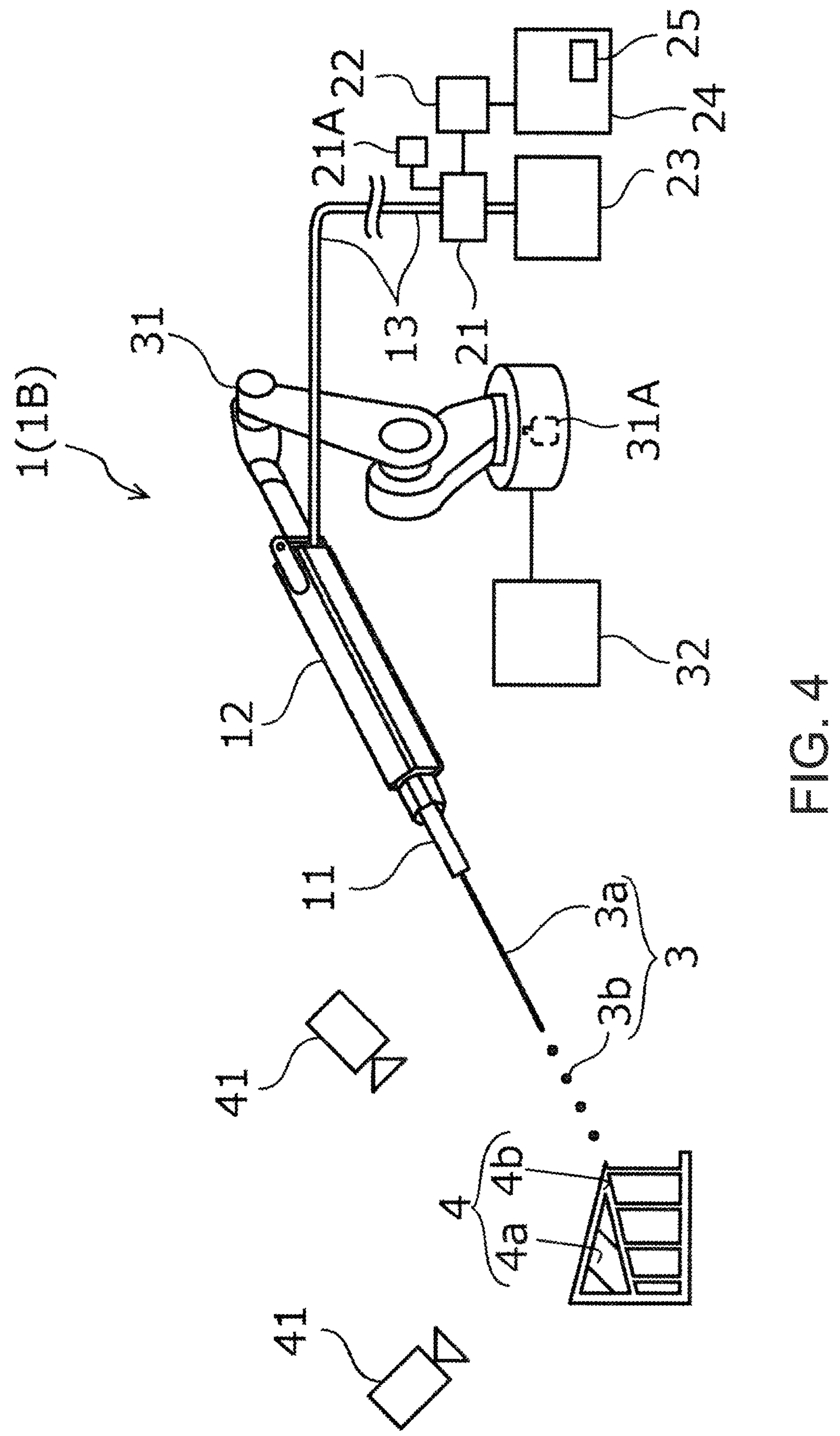
FIG. 4 is a schematic view showing the support material removal device according to a second embodiment.

Below, a support material removal device 1B according to a second embodiment will be described with reference to FIG. 4. FIG. 4 is a view corresponding to FIG. 1 of the support material removal device 1A of the first embodiment. The support material removal device 1B of the present embodiment is the same as the support material removal device 1A of the first embodiment except for the configuration described below. Therefore, the support material removal device 1B of the present embodiment has the same features as the support material removal device 1A of the first embodiment except for portions described below. Therefore, in FIG. 4, constituent members common to the first embodiment are denoted by the same reference numerals, and a detailed description thereof will be omitted.

As shown in FIG. 4, the support material removal device 1B of this embodiment is provided with a detection section 41 for detecting the support material 4*b* attached to the ejection target 4. The arm control section 32 as the trajectory calculating section can calculate the trajectory of the arm 31 based on the detection result of the detection section 41. Therefore, the support material removal device 1B of this embodiment can recognize when there is a region where the support material 4*b* has not been removed, and can suppress the support material 4*b* from remaining on the three-dimensional molded object 4*a*. For example, it is possible to detect the remaining portion of the support material 4*b* after rough removal, and to eject the liquid 3 only to the place where the remaining portion of support material 4*b* is present.

Here, the detection section 41 in the support material removal device 1B of the present embodiment is a camera capable of optically capturing a video or still image of the ejection target 4 and, by capturing the image of the ejection target 4, can detect the support material 4*b* attached to the ejection target 4*a*. With such a configuration, it is possible to improve the detection performance of the support material 4*b* attached to the ejection target 4. Note that although the number and arrangement of the detection section 41 are not particularly limited, it is desirable that the detection section 41 be configured to be capable of detecting the ejection target 4 from all angles of 360°.

Third Embodiment

Figure 5:
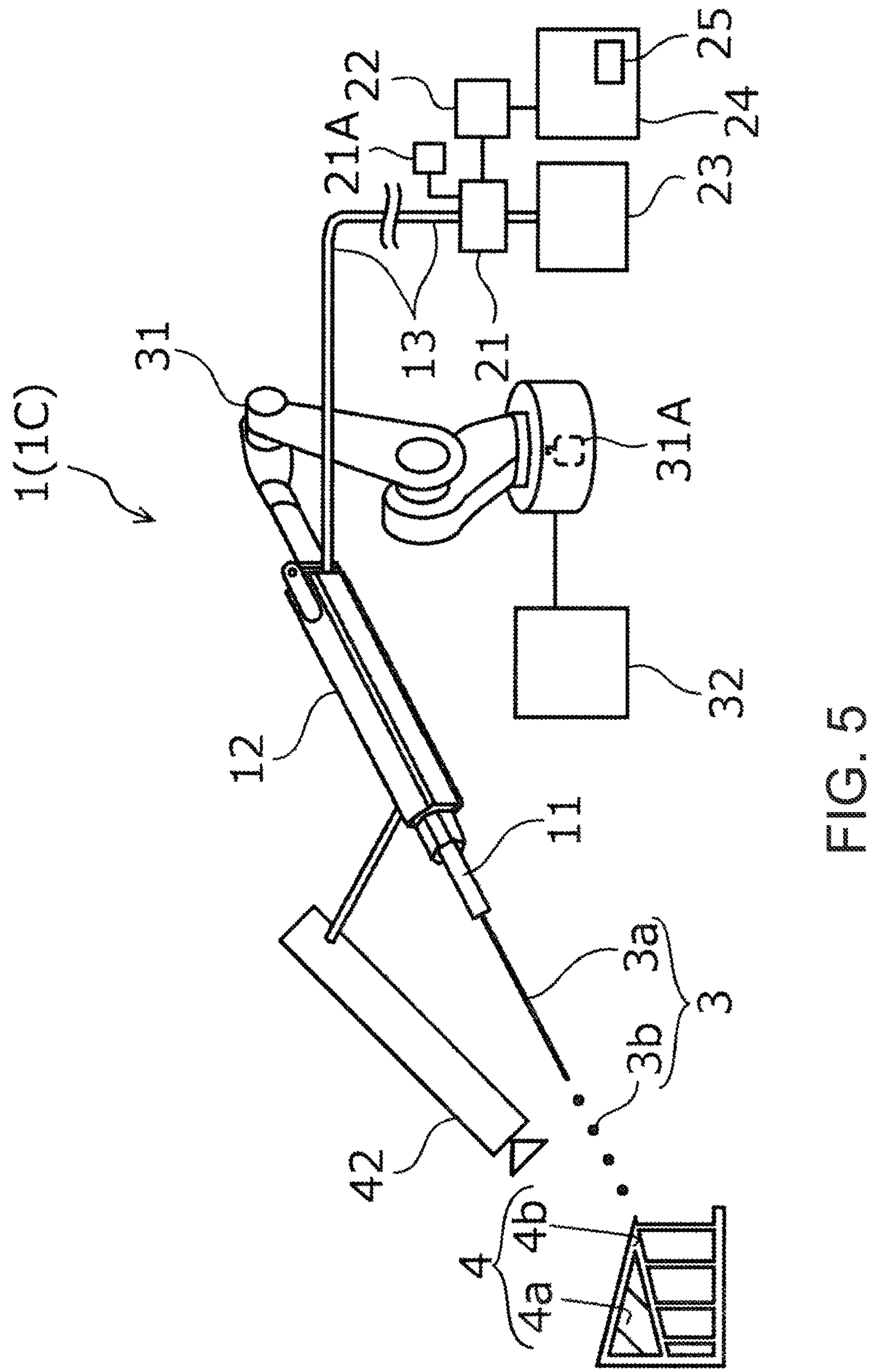
FIG. 5 is a schematic view showing the support material removal device according to a third embodiment.

A support material removal device 1C according to third embodiment will be described below with reference to FIG. 5. FIG. 5 is a view corresponding to FIG. 1 in the support material removal device 1A of the first embodiment. The support material removal device 1C of the present embodiment is the same as the support material removal device 1 of the first embodiment and the second embodiment except for the configuration described below. Therefore, the support material removal device 1C of this embodiment has the same features as the support material removal device 1 of the first embodiment and the second embodiment except for the configuration described below. Therefore, in FIG. 5, constituent members common to the first embodiment and the second embodiment are denoted by the same reference numerals, and a detailed description thereof will be omitted.

As shown in FIG. 5, the support material removal device 1C of the present embodiment is provided with an imaging section 42 for observing the liquid 3 ejected from the nozzle 11, more specifically, the liquid droplets 3*b* colliding with the support material 4*b*. The imaging section 42 of this embodiment is a camera capable of optically capturing a video and a still image, and is mounted on the main body 12. Therefore, it is possible to confirm whether or not the liquid 3 is colliding with the support material 4*b* as droplets 3*b*, and it is possible to suppress a decrease in the effect of removing the material support 4*b* from the three-dimensional molded object 4*a*. The imaging section 42 of the present embodiment can also play a role similar to that of the detection section 41 of the support material removal device 1B of the second embodiment.

The present disclosure is not limited to the above-described embodiments, and can be realized by various configurations without departing from the spirit thereof. The technical features in the embodiments corresponding to the technical features in each of the embodiments described in the Summary section can be appropriately replaced or combined in order to solve some or all of the above-mentioned problem or achieve some or all of the above-mentioned effects. If a technical feature is not described as an essential feature in the present specification, the technical feature can be deleted as appropriate. For example, the support material removal device 1 of the above embodiment may be included as a portion of a three-dimensional molding machine.

What is claimed is:

1. A support material removal device that removes a support material from a three-dimensional molded object molded by a three-dimensional molding machine, the support material removal device comprising:

a nozzle configured to:

eject liquid in a continuous flow; and change the continuous flow to droplets so that the liquid collides with an ejection target in the form of droplets;

an arm configured to grip the nozzle;

an arm control section configured to calculate a trajectory for driving the arm based on first shape information, which indicates a shape of the ejection target in a state where the support material is attached, and on second shape information, which indicates a shape of the three-dimensional molded object corresponding to a state where the support material has been removed from the ejection target; and a motor configured to drive the arm based on the trajectory calculated by the arm control section.

2. The support material removal device according to claim 1, further comprising:

an ejection pressure adjustment section that adjusts an ejection pressure of the liquid from the nozzle based on a shape of the support material or a type of the support material in the first shape information.

3. The support material removal device according to claim 2, wherein the shape of the support material is a volume of the support material contained per unit volume.

4. The support material removal device according to claim 1, wherein the arm control is further configured to calculate a first trajectory for removing a portion of the support material from the ejection target and a second trajectory for further removing support material attached to the ejection target from which the portion of the support material was removed.

5. The support material removal device according to claim 1, wherein the arm is configured to hold the nozzle such that an ejection direction of the liquid from the nozzle is movable and is configured to adjust the ejection direction of the liquid from the nozzle based on a shape of the support material in the first shape information.

6. The support material removal device according to claim 1, further comprising:

a detection section configured to detect the support material attached to the ejection target, wherein the arm control section is further configured to calculate the trajectory based on a detection result of the detection section.

7. The support material removal device according to claim 6, wherein the detection section is further configured to detect the support material attached to the ejection target by capturing an image of the ejection target.

8. A support material removal method of using a support material removal device, which includes a nozzle for ejecting liquid in a continuous flow, and changing the continuous flow to droplets so that the liquid collides with an ejection target in the form of the droplets and an arm for gripping the nozzle, to eject the liquid against the ejection target, which was molded by a three-dimensional molding machine that shaped a three-dimensional molded object while the three-dimensional molded object was supported by a support material, in order to, with respect to the ejection target, remove the support material from the three-dimensional molded object, the support material removal method comprising:

calculating a trajectory for driving the arm based on first shape information, which indicates a shape of the ejection target in a state in which the support material is attached, and second shape information, which indicates a shape of the three-dimensional molded object corresponding to a state in which the support material has been removed from the ejection target; and based on the calculated trajectory, driving the arm and ejecting the liquid from the nozzle to remove the support material.

* * * * *